United States Patent [19]

Dill et al.

[11] Patent Number: 4,616,310
[45] Date of Patent: Oct. 7, 1986

[54] COMMUNICATING RANDOM ACCESS MEMORY

[75] Inventors: Frederick H. Dill, South Salem; Daniel T. Ling; Richard E. Matick, both of Peekskill; Dennis J. McBride, Shrub Oak, all of N.Y.

[73] Assignee: International Business Machines Corporation, Armonk, N.Y.

[21] Appl. No.: 496,726

[22] Filed: May 20, 1983

[51] Int. Cl.[4] .......................... G06F 15/16; G11C 7/00
[52] U.S. Cl. ...................................... 364/200; 365/189
[58] Field of Search ... 364/200 MS File, 900 MS File; 365/189, 230, 94, 190

[56] References Cited

U.S. PATENT DOCUMENTS

| | | | |
|---|---|---|---|
| 4,096,571 | 6/1978 | Vander Mey | 364/200 |
| 4,212,057 | 7/1980 | Devlin et al. | 364/200 |
| 4,257,095 | 3/1981 | Nadir | 364/200 |
| 4,280,197 | 7/1981 | Schlig | 365/154 |
| 4,541,075 | 9/1985 | Dill | 365/189 |

Primary Examiner—James D. Thomas
Assistant Examiner—Christopher Lynt
Attorney, Agent, or Firm—John J. Goodwin

[57] ABSTRACT

A communicating random access shared memory configuration for a multiprocessor system is connected to the processors for transferring data between the processors. The random access memory configuration includes a plurality of interconnected random access memory chips, each of these memory chips including first and second separate memory bit arrays having N word storage locations of M bit length with M bit buffer connected in between the first and second bit arrays on each memory chip, and first and second input/output ports connected to first and second bit arrays on each chip for entering and removing data externally to and from the chip. A controller is located on each chip and connected to the first and second memory arrays and the M bit buffer for transferring data between the first and second memory arrays and into and out of the first and second input/output ports.

7 Claims, 5 Drawing Figures

COMMUNICATING RANDOM ACCESS MEMORY

BACKGROUND OF THE INVENTION

1. Field of the Invention

The present invention relates to data processing systems and more particularly to data processing systems of the type having memory systems that interface with other parts of the data processing system.

2. Description of the Prior Art

There are many references in the prior art that relate to computing systems employing some form of memory sharing. Some examples follow.

U.S. Pat. No. 4,096,571 issued June 20, 1978 to Vander Mey, entitled SYSTEM FOR RESOLVING MEMORY ACCESS CONFLICTS AMONG PROCESSORS AND MINIMIZING PROCESSOR WAITING TIMES FOR ACCESS TO MEMORY BY COMPARING WAITING TIMES AND BREAKING TIES BY AN ARBITRARY PRIORITY RANKING, describes a computer system embodying four processor modules and four memory modules. The processors share the memory modules on a time shared basis. Bidirectional data transfers between memories and processors are accomplished by using a group of common signal lines called the address/data bus which supplies and transfers the data.

U.S. Pat. No. 4,257,095 issued March 17, 1981 to Nadir, entitled SYSTEM BUS ARBITRATION, CIRCUITRY AND METHODOLOGY describes a structure wherein a system bus and a plurality of digital processors, input and output devices and memories may be shared in an intelligent and efficient manner by using an arbitration method and an arbiter and bus controller circuit which allows a lower priority processor or user to access the system bus during those times in which a higher priority user of the system bus is not actively accessing the system bus.

These two references are typical of shared bus systems and are distinct from the linked memory concept of the present invention.

U.S. Pat. No. 4,212,057 issued July 8, 1980 to Devlin et al and entitled SHARED MEMORY MULTI-MICROPROCESSOR COMPUTER SYSTEM describes a computer system having two or more substantially independent processors each of which has its own bus-type interconnection structure, and a shared memory accessible by any of the processors without interferring with the proper operation of the other processors. The shared memory may, if desired, appear to each of the two or more processors sharing it to be a different section of the total memory capability of the processor.

This reference describes a shared memory system which is quite different from the present invention. In the present invention the sharing is accomplished by using a special memory chip and each processor has access to a separate memory array. Communications between these arrays are mediated through the on-chip row buffer allowing a very wide data path width between the arrays.

In U.S. Pat. No. 4,212,057, the two processors share a common memory array with circuitry which merely provides access to the common array by both processors on a contention or priority basis.

U.S. Pat. No. 4,280,197 issued July 21, 1981 to Schlig and entitled MULTIPLE ACCESS STORE is cited because it shows a memory cell permitting simultaneous read/write functions which is, however, quite different from the present invention.

In addition to the prior art cited above, U.S. Pat. No. 4,541,075 issued Sept. 10, 1985 to Dill et al entitled QUASI TWO PORT MEMORY, filed June 30, 1982 describes a 256×256 bit array with row addresses applied thereto. Column addresses are applied to sense amplifiers and to a row buffer, a secondary port is provided and employed for improved efficiency of data transfer.

SUMMARY OF THE INVENTION

Memory systems in typical processor environments generally have more than one logical interface to the other parts of the system. For instance, a main memory must interface to a cache (CPU) at one time, and simultaneously to the I/O (disk).

Similarly, a cache must interface to the CPU and to the main memory. Such interfaces are obtained via the usual port provided to the memory or cache. Improved performance in modern computing systems has been obtained in numerous ways, some of these being multi-processing, shared memories and extensive use of cache. These lead to even larger bandwidths and capacity requirements on the memory systems, and the bandwidth has become a serious bottleneck. Attempts to improve the bandwidth in the conventional ways, using standard random access memory organization, have not been able to keep up with the requirements. An object of the present invention is to provide new random access memory chip structures (communicating RAMs) and system organizations to eliminate these bottlenecks.

In other cases, bandwidth is most effectively increased by providing a second I/O port; however, once again, the cost can be excessive. The present invention relates to novel memory configurations which are cost effective means of increasing memory bandwidth for applications where the memory is shared, and/or rapid memory-to-memory transfers are needed.

The cost effectiveness is achieved by use of a quasi-two port communicating memory chip which provides very nearly the bandwidth of a true two-port memory but at a much lower cost. A true two-port would either use two separate arrays for the same information, or a much more complex memory cell. The communicating RAM uses ordinary dynamic memory chips with the addition of a row buffer register and other controls to latch the usual 256 or 512 sense amplifiers, and isolators (FET switches) to select the row buffer and/or isolate it from normal memory operation.

Another object therefore of the present invention, is to provide a communicating random access memory system wherein data is transferred between memories.

A further object of the present invention is to provide a communicating multiprocessor random access memory system wherein each processor has access to a separate memory array and communication takes place via an on-chip row buffer circuit.

The foregoing and other objects, features and advantages of the invention will be apparent from the following more particular description of the invention as illustrated in the accompanying drawings.

DESCRIPTION OF THE PREFERRED EMBODIMENT

The communicating RAM concept is defined in terms of three different but related structure approaches.

Figure 2:
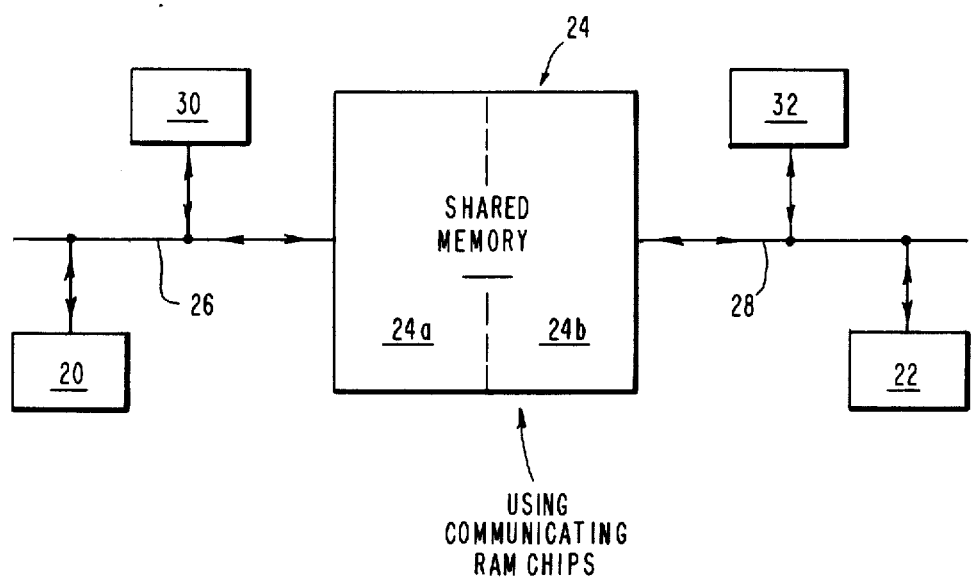
FIG. 2 is a schematic block diagram of a computing system using the shared memory configuration of FIG. 1 wherein the sharing occurs in main memory.
Figure 3:
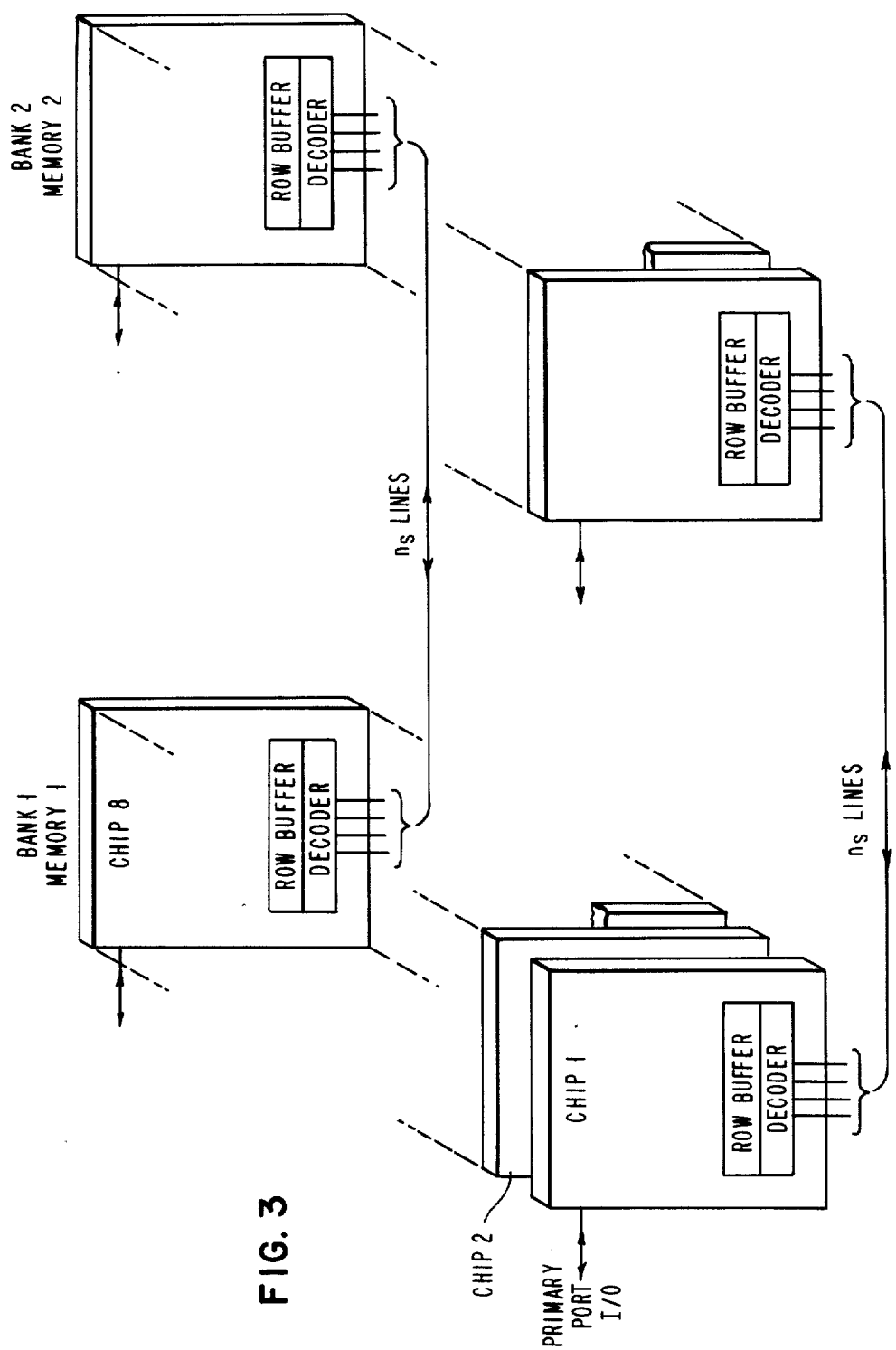
FIG. 3 is a schematic block diagram of an embodiment of the present invention wherein the shared data paths can go off-chip.

The first structure approach provides fast, nearly simultaneous access to the same (shared) data. For systems requiring sharing of parts of memory, the communicating RAM with one row buffer provides a very large, on-chip data path to allow transfer of shared portions of data between separate memories. This embodiment is described relative to FIGS. 1, 2, and 4. FIG. 3 is a variation of this concept.

The second structure approach provides fast, simultaneous access to different data in the same memory in addition to the primary port. Two on-chip row buffers with decoders provide two independent, asynchronous secondary ports.

The third structure is a combination approach of the first and second approaches. One row buffer interfaces to allow quick transfer of shared data between memories while two other independent row buffers allow simultaneous access to different data. This approach is described relative to FIG. 5.

Figure 1:
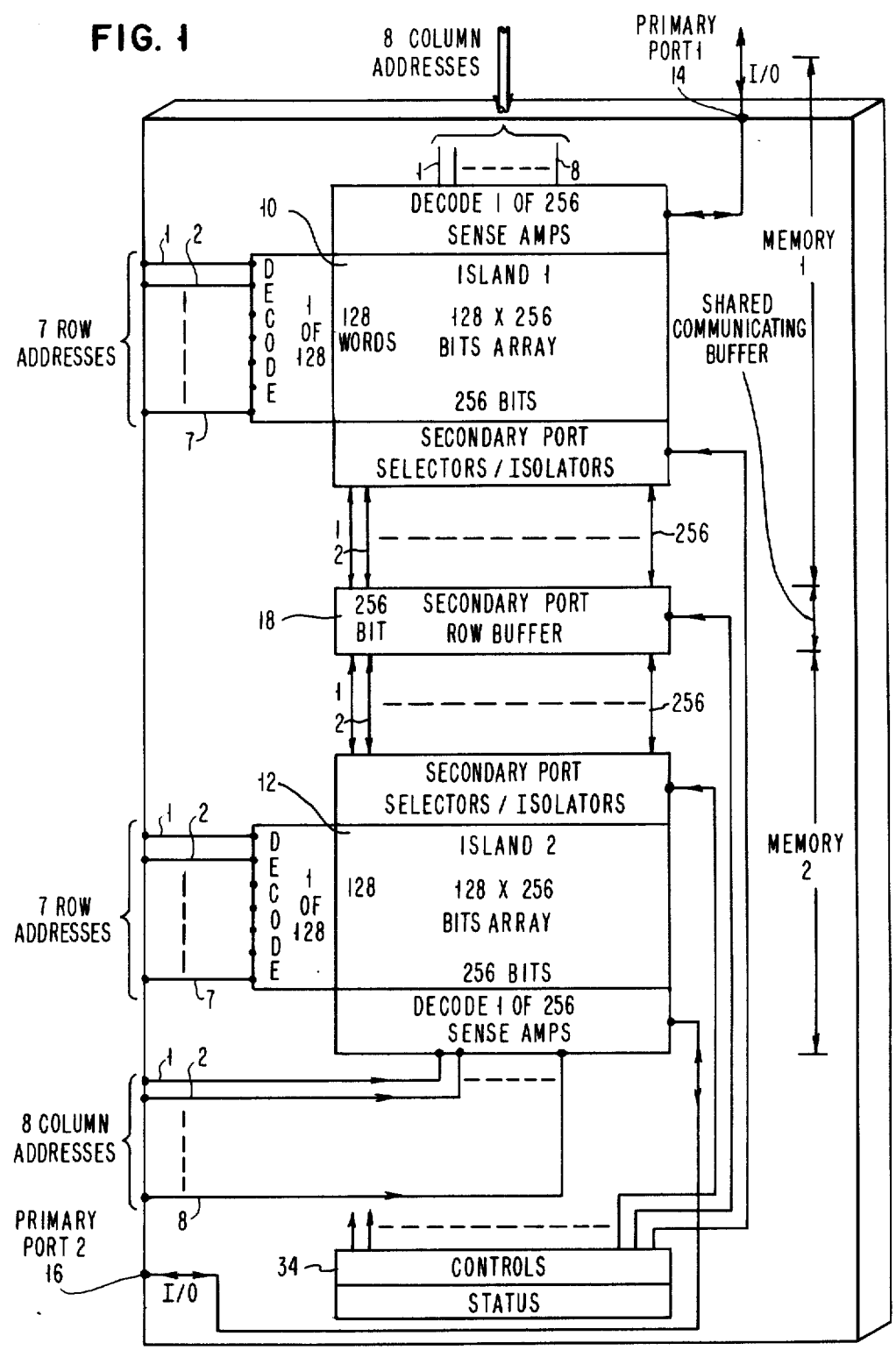
FIG. 1 is a schematic block diagram of a shared communicating memory chip configuration according to the principles of the present invention.

FIG. 1 illustrates one version, in block form, of a communicating memory configuration using memory chips which contain 64k bits. The chips have conceptually one or more bit arrays each consisting of words 256 bits long.

More particularly, in FIG. 1, each memory chip has two bit arrays 10 and 12, each belonging to a different logical memory island. Sixteen chips would therefore provide two 64k byte memories; the top islands of the sixteen chips being one memory and the bottom islands being the other memory. The two I/O ports 14,16 that are brought off the chip are both conventional, primary ports; one for each of the memories. The buffered secondary port is now located entirely on the chip. With sixteen chips, transfers between the two memories can occur 512 bytes at a time (i.e., 16×256 bits). The row buffer 18 is provided with selector isolators such as simple FET switches so that data can be read when one memory is free and written when the other memory is free. The entire transfer can therefore take place "invisibly" with no chip-to-chip transfer. An on-chip controller is needed to carry out this function.

One specific application of the communicating RAM concept embodied in FIG. 1 occurs when two bus-oriented microprocessors need to share some memory. One solution is to place both microprocessors and their memories on a common bus, however, the bus bandwidth available will be halved and system performance may be adversely affected.

Another solution is to attach the shared memory on a common bus which is interfaced to each processor's respective private bus by means of an interface unit. However, there is still a bus contention problem if both processors need to read the shared memory simultaneously. Using memory chips configured as in FIG. 1, a system as shown in FIG. 2 is provided. The two processors 20 and 22, with their memories 30,32 and their buses 26 and 28 are now linked by the shared memory 24 which employs random access memory chips. Processor 20 can write into its half of the shared memory and initiate a transfer. The data is transferred very rapidly over a wide on-chip data path. When the transfer is complete, both processors 20 and 22 can read the data simultaneously without contention. If processor 22 needs to modify the data, it can write into its half of the memory and inititate another transfer. Note that with 16 64k bit chips each organized as shown in FIG. 1, each processor has 64k bytes of shared memory. The transfer of the entire memory can take place in 128 memory cycle times, and of smaller amounts of memory in correspondingly less time. An on-chip control unit (34 FIG. 1) is needed to oversee the transfer process and provide status information to the two processors. A sophisticated controller could also relocate the data during the transfer operation, i.e. the k-th 256 bit row in one half of memory need not be copied into the same row in the second half. This linked memory architecture is particularly useful in situations where processing is accomplished in stages by separate general or special purpose processors. Data processed by processor "n" is rapidly transferred to processor "n+1", and processor "n" can immediately start processing new data. Thus the processors may execute asynchronously and in parallel with synchronization occuring only at data transfer time. High performance graphics display systems seem to be ideal vehicles for such an architecture.

The communicating RAM using the chip configuration of FIG. 1 is attractive because it avoids chip-to-chip transfer of data and avoids the need for any decoding on the row buffer since 256 bits can be transferred directly. Decoders can be used, if desirable, to select only certain parts of the 256 bits on each chip for transfer. It should be noted, however, that if the memory system configuration is such that data must be transferred between memory chips, the row buffer is still useful. For instance, suppose the two separate memories each consist of a bank of eight chips as in FIG. 3, the transfer of data between these would consist first of loading the 256 bit row buffers on eight chips. Then the data is transferred on a separate bidirectional bus to the row buffer of the second bank of eight chips. The rate at which this is done is dependent on the number of I/O pins and bus lines, $n_s$, connecting the secondary ports between pairs of chips in the two banks as shown. If there were 64 such lines (i.e., $n_s=64$) between chip pairs, then four cycles of the row buffer would be required to transfer 256 bits from each of the eight chips of the first bank to each of eight chips of the second bank. Also, a decoder to select 64 out of 256 would be needed on each chip, plus a read/write control signal to each row buffer. While such transfer was taking place, normal read/write can occur simultaneously via the primary port I/O.

Figure 4:
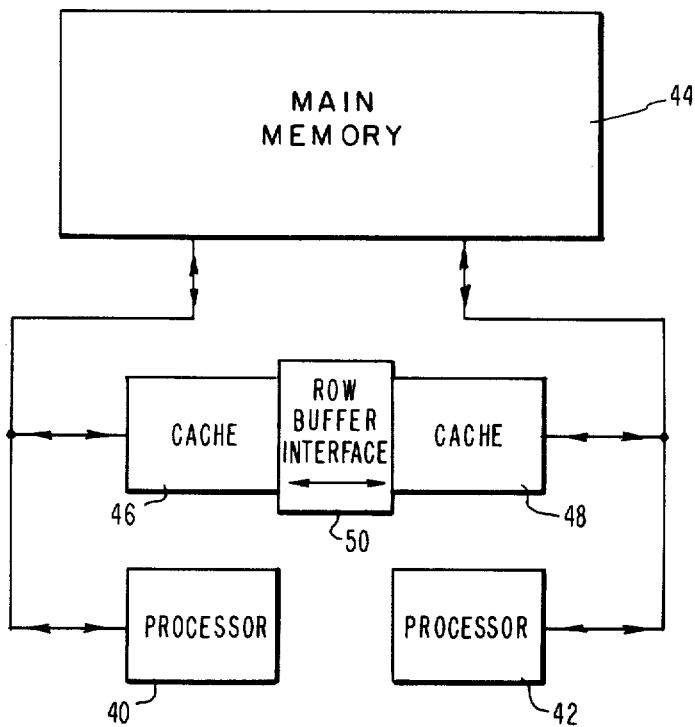
FIG. 4 is a schematic block diagram of another shared memory configuration wherein the shared memory is a store-in cache and the two caches must interface to the CPU and main memory.

Another example of the use of the communicating RAM is shown in FIG. 4 where now the cache memory chips are organized as in FIG. 1 (note: the cache chips can be made in a different technology to be faster). This configuration consists of two processors 40 and 42 which share main memory 44 and in addition, have their own caches 46 and 48 connected by a row buffer interface 50 (the connection of main memory to the cache can be by way of two on-chip row buffers described later). The caches work in a store-in mode wherein the latest changes in information reside only in the cache. These changes are written back to main memory only when a cache miss and subsequent "block write-back" occurs. In this case, if processor 40 has a cache miss it must first interrogate the directory of cache 48 to see if the desired block is located in the other cache. If the answer is "yes", the desired block must be transferred from cache 48 to cache 46. This transfer can be greatly facilitated if the cache memory chips have the row buffer interface configuration shown in FIG. 1 for interface 50. The on-chip control unit can transfer the appropriate cache block in one cycle so that processor 42 is locked out of its cache for only one cache read cycle. Note that the size of the memory bit arrays and the bit array aspect ratio should be designed bearing in mind the size of the cache block and the overall cache size. Again, appropriate interlock mechanisms are needed. The examples in FIGS. 2 and 4 use communicating RAM's with only one row buffer in a particular mode of sharing. It is apparent that two or more row buffers can be incorporated on-chip to provide additional versatility. For instance, two row buffers on-chip would allow the two organizations of FIGS. 2 and 4 to share data with other memories simultaneously. Another particularly important application of such a general concept is shown in FIG. 5 which consists of a multiprocessing environment where two (or more) processors 52,54 are sharing main memory 56, and each processor has its own private cache 58,60.

In prior art systems using two or more processors, contention will arise when both processors try to access main memory simultaneously. This contention problem is greatly reduced when the main memory uses chips and the system configurated as in FIG. 5. The caches 58,60 are assumed to be store-through which require a write-back to main memory 56 anytime changes are made to any information in cache. Under this condition, if processor 52 has a cache miss, it will need to get a new cache block from memory. Processor 54 will also need to access main memory 56 each time information in its cache is changed. Suppose the caches use 128 byte blocks and that the buses 62,64 between the caches 58,60 and main memory 56 is eight bytes wide. Suppose further that the main memory 56 is organized as stacks of 16 chips each. When processor 52 has a cache miss, it addresses the main memory 56 and in one read cycle time loads four cache blocks into row buffer 66. The desired cache block is then decoded and placed on data bus 62. Note that since the data bus is 64 bits wide, each chip places four bits onto the data bus. Processor 54 is locked out of main memory for only one read access cycle. If conventional memory chips organized as 16k×4 bits were used, processor 54 would be locked out for 16 read cycles. Appropriate interlocks must be provided so that invalid data is not given to any processor. These interlocks are application dependent and will not be described further. This configuration thus provides a significant improvement in bandwidth for a store-through cache in a multiprocessing environment.

There are other similar applications in which the details are different but the essential concepts are the same. For instance, in systems employing arrays of microprocessors without caches, several processors often have need for simultaneous access to different blocks of information in memory. The configuration of FIG. 5 can find use in many such applications.

Figure 5:
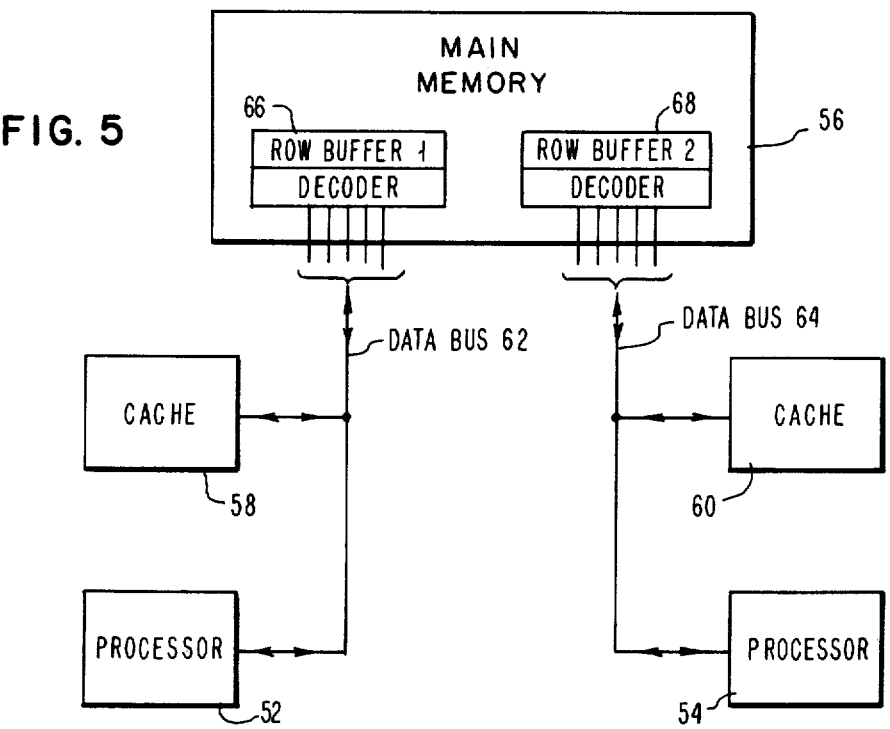
FIG. 5 is a variation of the embodiment of FIG. 1 wherein two row buffers are provided to allow simultaneous access to different data in the same memory.

It should be obvious that an even more general communicating RAM configuration can be obtained by combining the principles of FIGS. 1 and 5. A chip such as in FIG. 1, with two separate memories that share via the row buffer interface 18, can have two additional new buffers as in FIG. 5 which are loaded from either one or both halves of the memories in FIG. 1. In such a case, simultaneous accesses to different data in each of their separate row buffers can be taking place while the shared data is simultaneously transferred between the two memories using the interface row buffer. It should further be noticed that sharing of the two halves of memory in FIG. 1 can be done with two independent row buffers (such as in FIG. 5) in place of the interface row buffer 18 as follows. Each row buffer can independently be loaded from memory 1 or 2 by a simple multiplexer. When CPU 1 requests shared data residing in memory 2, the data is first checked for access rights and if permitted, is loaded into row buffer 1. CPU/cache 1 then has access to this data. The limitation to such a scheme is that each time row buffer 1 is loaded from memory 2, the access rights must be checked, even if this data was previously referenced. This is time consuming and awkward. It is better to block load the entire segment of shared data at one time from memory 2 to 1, giving CPU/cache 1 free access to the entire data.

What has been described is a quasi-two port memory system employing a communicationg random access memory using dynamic memory chips having on-chip row buffers and controls. Particular embodiments of the memory system have also been described including memory sharing a main memory, memory sharing wherein the shared data paths can go off-chip, memory sharing using a store-in cache with two caches interfacing to a CPU and main memory, and an embodiment wherein two row buffers are provided so as to allow simultaneous access to different data in the same memory.

Having thus described our invention, what we claim as new, and desire to secure by Letters Patent is:

1. In a multiprocessor system, a communicating random access shared memory configuration connected to said processors by electrically conductive buses for transferring data between said processors comprising a plurality of interconnected random access memory chips, each of said memory chips including first and second separate memory bit arrays having N word storage locations of M bit length, M bit buffer means connected in between said first and second bit arrays on each memory chip, a first input/output port connected to said first bit array on each chip and an electrically conductive bus for entering and removing data externally to and from said chip, a second input/output port connected to said second bit array on each chip and an electrically conductive bus for entering and removing data externally to and from said chip, and control means on each chip connected to said first and second memory arrays and said M bit buffer means for transferring data between said first and second memory arrays and into and out of said first and second input/output ports.

2. In a multiprocessor system according to claim 1 wherein a first group of said plurality of interconnected random access memory chips are located in a first of a plurality of separate memory banks, a second group of said plurality of interconnected random access memory chips are located in a second of said plurality of separate memory banks, the number of memory chips in said first and second group being equal, and bidirectional electrically conductive bus means connecting said second input/output port of each of said memory chips in one of said memory banks to a corresponding one of said memory chips in the other one of said at least two memory banks.

3. A multiprocessor or system according to claim 1 wherein a first processor including a main memory is connected to said first input/output ports of said plurality of random access memory chips, and a second processor including a main memory is connected to said second input/output ports of said plurality of random access memory chips.

4. A multiprocessor system according to claim 3 wherein said main memory of said first and second processor is a single memory shared by said processors, said first and second memory bit arrays each include an on-chip row buffer and are connected to said first and second memory bit arrays of said random access memory chips by said on-chip row buffers.

5. A multiprocessor system according to claim 3 wherein said main memory of said first processor and said main memory of said second processor are first and second separate main memories connected to said first and second separate bit arrays of said random access memory chips by means of on-chip row buffers.

6. A multiprocessor system according to claim 3 wherein said main memory further includes a separate M bit buffer and decoder means connected to each of said first and second memory bit arrays.

7. In a multiprocessor system including a plurality of separate processors, a communicating random access shared memory configuration comprising a plurality of interconnected random access memory chips and electrically conductive data bus, said random access memory being connected to said processors by said bus for transferring data between said processors, each of said memory chips including first and second separate memory bit arrays having N word storage locations of M bit length, M bit buffer means connected in between said first and said second separate memory bit arrays on each memory chip, a first input/output port connected to said first bit array on each chip for entering and removing data externally to and from said chip, a second input/output port connected to said second bit array on each chip for entering and removing data externally to and from said chip, a main memory electrically connected to said processors and said random access memory chips, by said data bus, a plurality of M bit buffer and decoder means, a separate one of said plurality of M bit buffer and decoder means being located in said main memory and connected to separate ones of said processors and random access memory chips, and control means on each chip connected to said first and second separate memory bit arrays and said M bit buffer means of its respective chip and to said M bit buffer and decoder means in said main memory via said electrically conductive data bus for transferring data between said first and second memory arrays and into and out of said first and second input/output ports.

* * * * *